United States Patent [19]

Pansire

[11] 4,180,964

[45] Jan. 1, 1980

[54] SELF-PROPELLED SELF-GUIDING LAWN MOWER

[76] Inventor: Dino G. Pansire, 219 E. Union St., Ashland, Mass. 01721

[21] Appl. No.: 784,164

[22] Filed: Apr. 4, 1977

[51] Int. Cl.$^2$ ................. A01D 75/28; A01D 55/18
[52] U.S. Cl. ............................ 56/10.2; 56/295; 56/DIG. 15
[58] Field of Search ............. 56/10.2, DIG. 15, 295; 180/79.1; 335/123

[56] References Cited

U.S. PATENT DOCUMENTS

| | | | |
|---|---|---|---|
| 1,465,279 | 8/1923 | Montague | 56/295 |
| 1,680,824 | 8/1928 | Thompson | 56/295 |
| 1,779,328 | 10/1930 | O'Brien | 335/128 |
| 2,321,874 | 6/1943 | Tandler et al. | 180/79.1 |
| 2,690,626 | 10/1954 | Gay et al. | 180/79.1 |
| 2,815,633 | 12/1957 | Meyer | 56/DIG. 15 |
| 2,990,902 | 7/1961 | Cataldo | 180/79.1 |
| 3,039,554 | 6/1962 | Hosking et al. | 180/79.1 |
| 3,049,843 | 8/1962 | Christensen | 56/295 |
| 3,073,409 | 1/1963 | Daifotes | 180/79.1 |
| 3,080,697 | 3/1963 | Mauro | 56/295 |
| 3,570,227 | 3/1971 | Ballinger | 56/10.2 |
| 3,598,196 | 8/1971 | Ballantyne | 180/79.1 |
| 3,662,830 | 5/1972 | Henriksen | 56/295 |
| 3,773,156 | 11/1973 | Nyqvist | 56/10.2 |
| 3,789,939 | 2/1974 | Grislinger | 56/DIG. 15 |
| 3,924,389 | 12/1975 | Kita | 56/10.2 |
| 3,972,381 | 8/1976 | Gail | 56/10.2 |

*Primary Examiner*—Louis G. Mancene
*Assistant Examiner*—Paul J. Hirsch
*Attorney, Agent, or Firm*—Irving M. Kriegsman

[57] ABSTRACT

A fully automatic self-propelled self-guiding lawn mower in which guidance of the lawn mower is based on the principal of a magnet following a passive ribbon or wire of ferromagnetic material. The lawn mower includes two drive wheels located on opposite sides of the vehicle. Each drive wheel is connected to a drive shaft on the vehicle through a separate solenoid controlled clutch and each drive wheel is equipped with a separate electromagnet controlled brake. The drive shaft is turned at a constant rate of speed by a battery powered electric motor. The guidance system for controlling the movement and direction of the lawn mower includes a rotably mounted bar magnet horizontally aligned with the longitudinal axis of the vehicle and fixedly coupled to an electrical contact wiper arm that traverses an arcuate array of radially extending electrical contacts. Each one of the contacts is coupled to different ones or combinations of the actuators that operate the clutches and brakes and other mechanisms associated with the vehicle. The cutter assembly portion of the lawn mower includes two different sets of cutting blades, a first set for performing the majority of the cutting of the grass and a second set for trimming off ragged edges of grass that might be left by the first set of cutting blades. Cleaning vanes are also provided. The cutting blade tip speed is relatively very slow; being set at about 3500 feet per minute.

12 Claims, 8 Drawing Figures

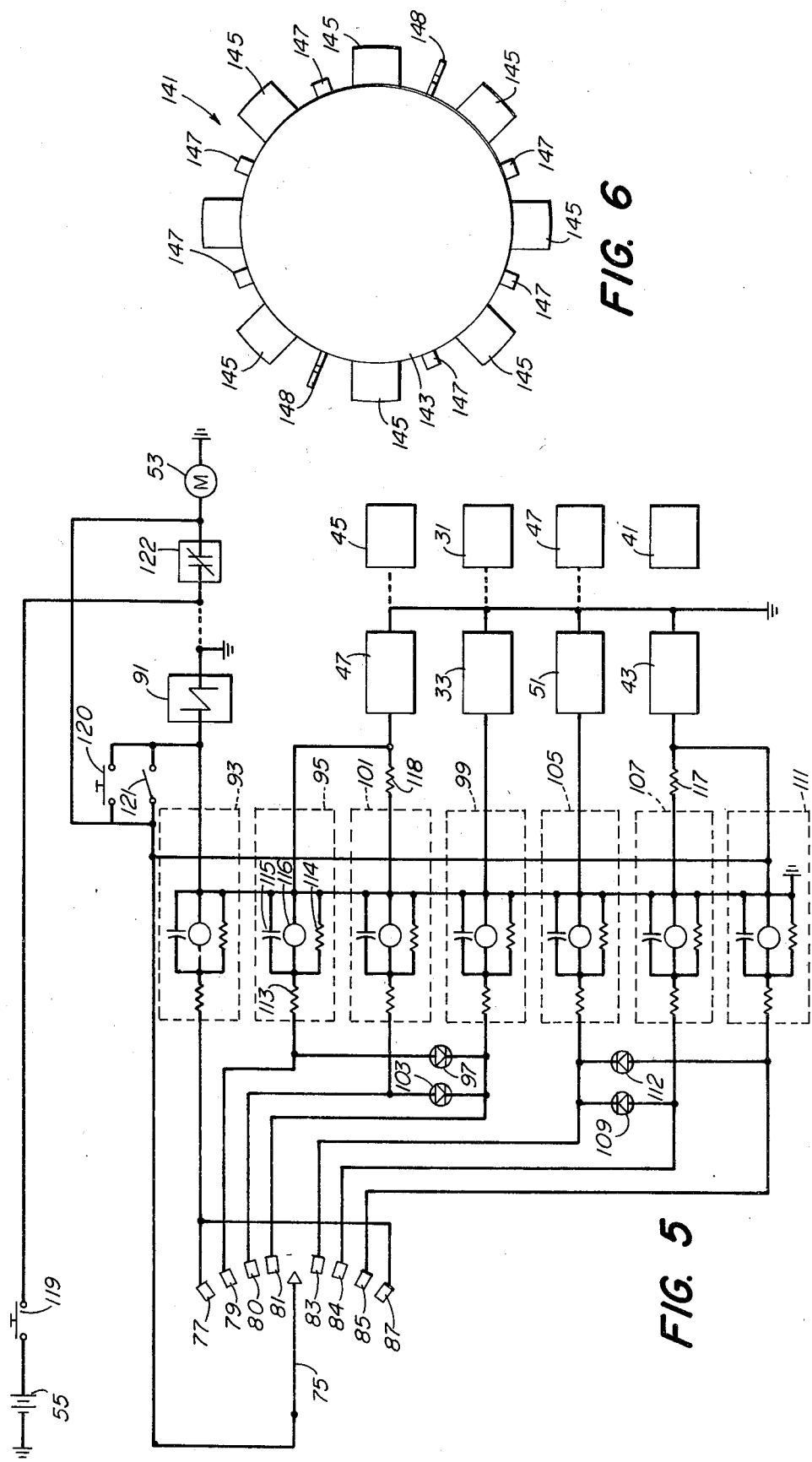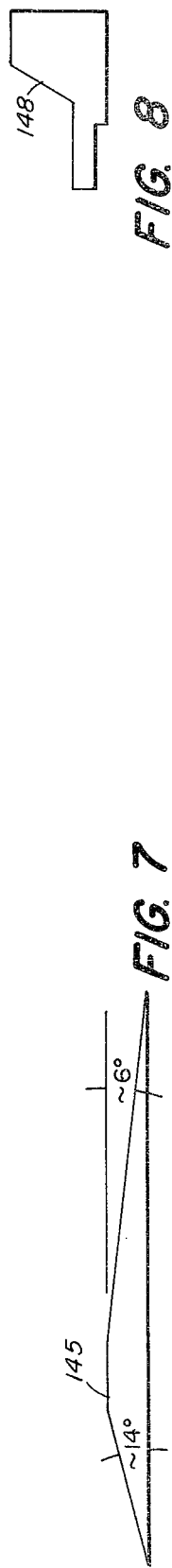

SELF-PROPELLED SELF-GUIDING LAWN MOWER

BACKGROUND OF THE INVENTION

This invention relates to a self-propelled self-guiding lawn mower. More particularly, this invention relates to a fully automatic self-propelled, self-guiding lawn mower wherein guidance of the mower is based on the principal of a magnet following a passive ribbon or wire of ferromagnetic material or permanent magnet impregnated materials.

There is now, and has been for some time a definite need for a lawn mower that is truly fully-automatic in operation. Although many different types of automatic lawn mowers have been proposed over the last thirty years, none have met with any real degree of commercial success for one reason or another.

While the present invention will be hereinafter described with specific reference to a lawn mower, it should be noted that certain aspects thereof are applicable to other types of repetitive process travelling machines, such as sweepers, waxers, snow plows and golf ball retrieval devices, which could be operated usefully in an unattended manner and limited in travel to a predefined path. Also, it will become apparent that certain aspects of the invention are applicable to lawn mowers that are not necessarily either self propelled or self guiding.

The basic concept of providing guidance for a machine utilizing the principal of a magnet located on the machine following a predetermined path defined by a passive wire of ferromagnetic material is known in the art.

For example, in U.S. Pat. No. 2,690,626 to G. R. F. Gay there is described a magnetically guided toy in which a U-shaped magnet is arranged to follow by magnetic pull or attraction a strip of solf iron mounted beneath the surface of the roadway on which the toy may run. The magnet is mechanically coupled to a steerable wheel journaled in an axle in a fork at the front of the vehicle. By reason of the magnetic pull of the magnet toward the soft iron strip, the magnet tends to align itself over the strip and thus causes the steerable wheel to follow closely the course of the strip. Although the magnetic forces generated by a relatively small magnet of good magnetic material might be sufficient to attract a relatively small lightweight toy to a ferromagnetic wire, the size of the magnet that would be needed to provide sufficient magnetic attraction to maintain a lawn mower weighing several pounds on course would be too large to provide a practical means for guidance for the mower.

In U.S. Pat. No. 3,073,409 to T. S. Diafotes there is described a self-propelled, self steering lawn mower designed to follow a passive ferromagnetic guide line laid on or in the ground. The lawn mower includes a U-shaped magnet which is mechanically coupled through a complex arrangement of depressor bars and belts to an electrically activated hydraulic system connected to brakes coupled to the driving wheels. One of the problems with the Diafotes machine is that the magnet size needed to produce sufficient force to operate the mechanical depressor bar and belt assembly is so large if at all achievable that the practical value of the machine is minimal. Another disadvantage of the guidance system disclosed in Diafotes is that there is no immediate fail-safe provision for turning off the mower if it should wander or for some other reason go off course. Still another disadvantage of the Diafotes mower is that there is no arrangement for preventing a "jerking" movement of the machine which might be caused by sudden movements of the magnet in following the ferromagnetic wire as the machine traverses a rough terrain.

Examples of self-propelled, self-steering lawn mowers or other machines having a guidance system based on means other than a magnet following a passive wire may be found in U.S. Pat. No. 3,052,076 to H. J. Bambi; U.S. Pat. No. 3,061,035 to J. A. King; U.S. Pat. No. 3,563,327 to D. Miller; and U.S. Pat. No. 3,736,484. Examples of self-propelled random-motion lawn mowers may be found in U.S. Pat. No. 3,570,227 to S. L Bellinger; and U.S. Pat. No. 3,550,714 to S. L. Bellinger; and an example of a rotary type green forage harvester considered pertinent to this invention may be found in U.S. Pat. No. 2,953,888.

SUMMARY OF THE INVENTION

It is an object of this invention to provide a new and improved lawn mower.

It is another object of this invention to provide a guidance system for an automatic lawn mower that is entirely passive.

It is still another object of this invention to provide a lawn mower that is fully automatic, self-propelled and self-guiding.

It is yet still another object of this invention to provide a self-guiding lawn mower in which guidance of the mower is based on the principal of a magnet following a passive ribbon or wire of ferromagnetic material or permanent magnet impregnated material laid on or in the ground.

It is still another object of this invention to provide a lawn mower of the type referred to above which will not have "jerking" directional movement as a result of the machine traveling over rough or undulating terrain.

It is yet still another object of this invention to provide a new and improved guidance system for controlling the steering wheels of a machine in response to rotational movements of a magnet in following a passive ribbon or wire of ferromagnetic material or permanent magnet impregnated material laid on or in the ground.

It is another object of this invention to provide a rotary blade type lawnmower in which the noise of operation of the cutting action is drastically reduced.

A lawn mower constructed according to this invention is made up basically of two parts, a prime mover and a mower cutting attachment. The prime mover includes a frame balanced by structural members projecting forward to a pair of caster type rollers which are a part of the cutting attachment and supported by a pair of rear drive wheels. The drive wheels are coupled to a continuously rotating drive shaft by individual solenoid actuated clutches and are equipped with individual electromagnet actuated brakes. By activating or deactivating the various actuators the velocity of each one of the drive wheels can be either slowed down or stopped so as to cause the prime mover to turn in a manner similar to that used in turning a tractor. The drive shaft is turned by a battery powered electric motor mounted on the frame. The prime mover also includes a guidance system for generating steering commands for selectivally actuating and deactuating the actuators. The guidance system includes a guidance head comprising a bar shaped magnet eccentrically fixed to a rotably mounted shaft. An electrical wiper is also fixedly mounted on the shaft and is positioned so as to traverse an arcuate array or radially extending electrical contacts. Each one of the contacts is coupled through an electrical circuit to one of the actuators that operate the various clutches and brakes as well as a solenoid actuated on-off switch and other solenoid actuated attachments or switches on the mower. Because of its eccentric mounting, when the magnet is out of the influence of the passive wire it will tilt to one side to an extreme position causing the wiper arm to move to an "end" contact which is electrically coupled to a solenoid connected to the main power "on-off" switch. The electrical circuit from each contact to its associated actuator is designed to include electronic damping means to compensate for spurious movements produced in the magnet as the mover travels over rough or undulating terrain. The magnet ostillations are also damped by it being at least partially immersed in a viscous fluid. Since the pickoff mechanism for translating rotational movement of the magnet to electrical signals which operate the actuators is in effect a rotary switch, the torque that must be generated to move the wiper arm of the switch from one contact to another need only be of a magnitude to overcome the torque due to friction between the electrical brush on the end of wiper arm as it is moved across the electrical contacts and other small losses in the system. The mower cutting attachment, which is mounted on 360° swivelling rollers, includes a rotating disk on which are peripherally mounted two separate sets of specially sized and shaped cutting blades, a first set for performing the majority of the basic cutting of the grass and a second group for cutting off ragged edges left by the first group of cutting blades due to the rate of speed at which the disk is made to turn. Cleaning vanes are also provided. The rotating disk is powered by the electric motor on the prime mover through an arrangement of roller chains and sprockets and is made to operate at a blade tip speed of 3000 to 4000 feet per minute. Since the blade speed is significantly lower than the blade speed of conventional rotary mowers, (i.e. 18000 feet per minute) the noise produced by the turning of the blades is greatly reduced. Furthermore, the shapes of the blades themselves and the angle of attack of the blades are such that blade noise is further reduced.

The foregoing and other objects and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which like reference numerals or characters represent like parts and wherein:

FIG. 5 is a schematic diagram of the electrical circuit of the guidance and control system of the lawn mower shown in FIG. 1.

FIG. 6 is a simplified and partially diagrammatic plan view of the rotary cutter assembly of the lawn mower shown in FIG. 1;

FIG. 7 is a section view taken along lines 6—6 in FIG. 5; and

FIG. 8 is a front elevation view of one of the cleaning vanes in the rotary cutter assembly in FIG. 6.

DESCRIPTION OF PREFERRED EMBODIMENT

Figure 1:
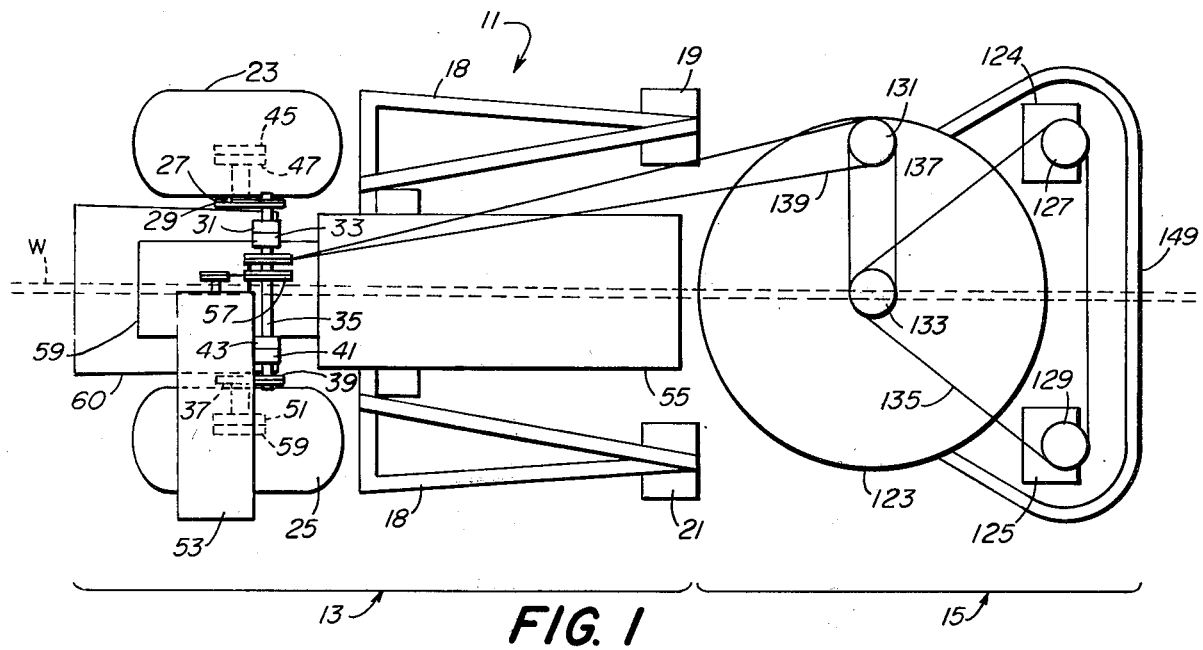
FIG. 1 is a simplified and partially diagrammatic plan view of a lawn mower constructed according to this invention, certain minor mechanical details being omitted for simplicity.
Figure 2:
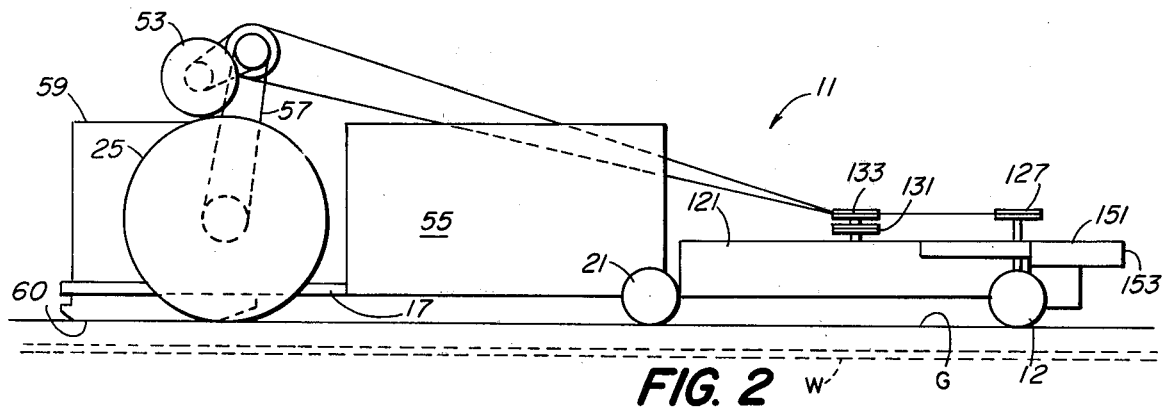
FIG. 2 is a front elevation view of the lawn mower shown in FIG. 1.
Figure 3:
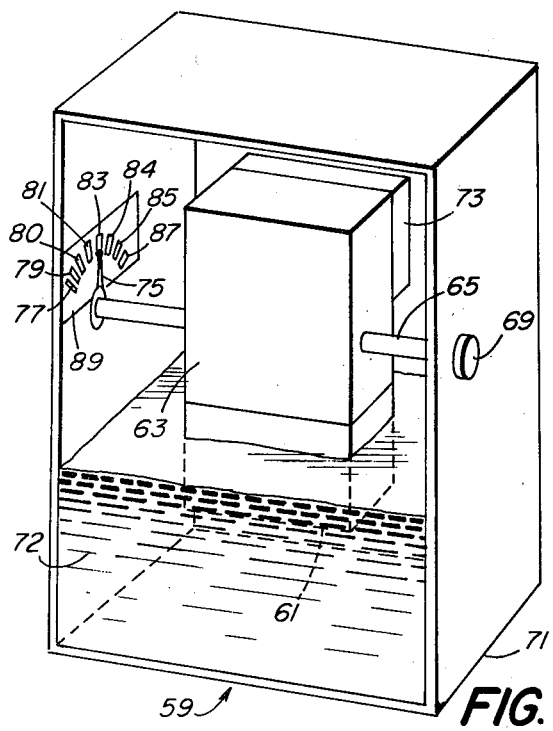
FIG. 3 is a perspective view of the guidance and control assembly of the lawn mower shown in FIG. 1.

Referring now to the drawings, there is shown in FIGS. 1 and 2 an illustrative embodiment of a lawn mower constructed according to this invention and identified generally by reference numeral 11.

Lawn mower 11 is made up basically of two parts, a prime mover 13 and a mower cutting attachment 15.

Prime mover 13 includes a frame 17 balanced on the front by structural members 18 to a pair of 360° swivelling rollers 19 and 21 which are part of cutting attachment 15 and supported at the rear by left and right drive wheels 23 and 25, respectively, which also serve to propel the prime mover 13. Each drive wheel is mounted on a separate axle, however, both drive wheels have a common center line. Left drive wheel 23 is coupled through sprocket wheels 27 and 29 to a power torque clutch 31 which is controlled by a solenoid 33 and which is connected to a continuously rotatable main drive shaft 35. Right drive wheel 25 is coupled to main drive shaft 35 through sprocket wheels 37 and 39 connected to a power torque clutch 41 operated and controlled by a solenoid 43. Drive wheel 23 is equipped with a brake 45 operated and controlled by an electromagnet 47 and drive wheel 25 is equipped with a brake 49 operated and controlled by an electromagnet 51. An electric motor 53 energized though a battery 55 continuously turns the main drive shaft 35 at a generally constant speed through a chain and sprocket assembly 57. For straight-ahead movement both clutches 31 and 41 are engaged and both drive wheels 23 and 25 receive equal power from drive shaft 35. For turning the prime mover 13 slowly to the right, clutch 41 is disengaged causing drive wheel 25 to stop or at least slow down due to rolling friction since it is not receiving power from drive shaft 35. This causes prime mover 13 to pivot about a point adjacent to right drive wheel 25 since left drive wheel 23 is still being driven at full speed by motor 53. For turning the prime mover 13 sharply to the right, clutch 41 is disengaged and at the same time brake 49 is applied to further slow or stop drive wheel 25. Left turns of the mower are achieved in the same manner. For stopping the prime mover 13, both clutches 31 and 41 are disengaged and brakes 45 and 49 are applied to their respective wheels.

Figure 4:
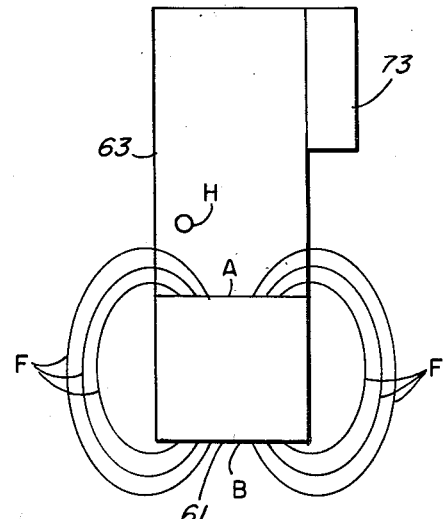
FIG. 4 is a side elevation view of the magnet and support in the guidance head shown in FIG. 3.

Also mounted on the frame 17 is a guidance and control assembly 59 for generating electrical signals for activating or deactivating the various relays which allow the operation of the motor, 53, the clutches 31 and 41 and the brakes 45 and 49 which are used to start, stop and steer the prime mover 13. Guidance and control assembly 59 is positioned on a skid pan 60 attached to frame 17 upright and along and about the longitudinal axis of frame 17 on or before to the center line defined by the axles of drive wheels 23 and 25 so that the signals generated thereby will be a true indication of the orientation of the prime mover 13 with respect to passive wire W. Guidance and control assembly 59 includes a bar magnet 61 rigidly secured (by means not shown) to a support bar 63 which is rigidly secured (by means not shown) to a shaft 65 that is pivotally mounted at its ends on bearings 67 and 69 journalled to opposite sides of an air tight housing 71. Bar magnet 61 is at least partially immersed in a viscous damping fluid 72 in the housing 71. Bar magnet 61 is mounted on support bar 63 so that one of its poles A is facing upward and the other pole B is facing downward directly towards the passive wire W, with the lines of force F as shown in FIG. 4. Housing 71 is positioned on frame 17 so that the axis of shaft 65 is parallel to the longitudinal axis of the prime mover section 13. Support bar 63 is eccentrically mounted on shaft 65 through an off centered hole H and in addition is provided with an eccentrically (but not necessarily separately) mounted weight 73. Because of the off-centered mounting of the support 63 on shaft 65 and the side mounting of weight 73, bar magnet 61 will tilt to one side when it is not being attracted to (under the influence of) the ferromagnetic wire W and will not extend down vertically. An electrical contact wiper arm 75 is fixedly mounted to shaft 65 and is spring biased (by means not shown) so as to brush up against an array of eight spaced apart conducting elements 77, 79, 80, 81, 83, 84, 85 and 87 mounted in an arcuate configeration on a board of material 89 attached (by means not shown) to the housing 71. Wiper arm 75 and the array of conducting elements taken together form, in effect, a rotary switch having a pivotally mounted head or wiper arm.

As can be seen in FIG. 5, contacts 77 and 87 are coupled to main power solenoid 91 through damping and enabling circuit 93, contact 79 is coupled to left brake electromagnet 47 through damping and enabling circuit 95 and also to left clutch solenoid 33 through diode 97 and damping and enabling circuit 99, contact 80 is coupled to left brake electromagnet 47 through damping and enabling circuit 101 and to left clutch solenoid 33 through diode 103 and damping and enabling circuit 99 and contact 81 is coupled to left clutch solenoid 33 through damping and enabling circuit 99. Also, contact 83 is coupled to right clutch solenoid 43 through damping and enabling circuit 105, contact 84 is coupled to right brake electromagnet 43 through damping and enabling circuit 107 and to right clutch solenoid 51 through diode 109 and damping and enabling circuit 105 and contact 85 is coupled to right brake electromagnet 43 through damping and enabling circuit 111 and to right clutch solenoid 51 through diode 112 and damping and enabling circuit 105. The damping and enabling circuits are all the same, with each circuit comprising a resistance 113 connected in series to a resistance 114, a capacitance 115 and a relay 116 which are all connected in parallel. The particular values of the components, however, may vary from circuit to circuit. The purpose of the damping and enabling circuits is to damp out erroneous signals which might be produced by sudden movements of magnet 61 and hence the wiper arm 75 when the prime mover 13 travels over rough and undulating terrain. The electrical system further includes voltage dropping resistances 117 and 118 which allow modulation of the electromagnet in the left brake 45 and right brake 49 respectively, an automatic start stop switch 119, a manual start-stop emergency kill switch 120, a bumper-kill switch 121 and a main power switch with manual reset 122.

Guidance and control assembly 59 controls the movement and direction of travel of the prime mover 13 in the following manner. When assembly 59 and hence magnet 61 is positioned directly above passive wire W, magnet 61 will be vertical and wiper arm 75 will be positioned between contacts 81 and 83. Both drive wheels 23 and 25 will turn at the same rate of speed and the prime mover 13 will move directly forward. If prime mover 13 moves slightly to the left of wire W, bar magnet 61 will tilt downward to the right causing wiper arm 75 to move to the left and touch contact 83, causing solenoid 51 to open and disengage clutch 41. This loss in power to wheel 25 will cause wheel 25 to slow down which in turn will cause the prime mover to turn to the right. If the prime mover 13 moves a slightly greater distance to the left, bar magnet 61 will tilt a slightly greater amount causing wiper arm 75 to move to contact 84 causing solenoid 51 to open to disengage clutch 41 and also actuate electromagnet 43 partially to engage brake 49. If prime mover 13 moves still further to the left, the wiper arm 75 will touch contact 85 causing clutch 47 to disengage and brake 41 to fully engage wheel 25. If prime mover 13 moves still further to the left, bar magnet 61 will tilt still further causing wiper arm 75 to touch contact 87 which actuates solenoid 91 to turn off all power. Movements of prime mover 13 and hence magnet 61 to the right of wire 11 will similarly cause the prime mover 13 to either turn to the left slowly or sharply or shut down depending on the extent of the deviation.

Mowing attachment 15 includes a dome 123 supported aft on the pair of 360° swivelling rollers 19 and 21 and a pair of front 360° swivelling rollers 124 and 125 which are connected through a system of sprockets 127, 129, 131, and 133 and chains 135, 137, and 139 to the main power drive shaft 35 of the prime mover 13. A cutting blade assembly 141 is mounted on a shaft (not shown) which is connected by sprockets (not shown) to sprocket 129. Cutting blade assembly 141, as can be seen in FIG. 6, comprises a central disc or hub 143 on which are peripherally mounted a plurality of main cutting blades 145 for performing the basic cutting of grass, a plurality of auxiliary cutting blade 147 for trimming the ragged edge that might be left by the main cutting blades, 145 due to the relatively slow rate at which the cutting assembly turns and a plurality of cleaning vanes 148. The main cutting blades 145 are about 3 inches long, 3 inches wide, about ¼" thick at the center and, as can be seen in FIG. 7, have a leading edge that tapers at an angle of about 14°, a trailing edge that tapers at an angle of about 6° and are set at an angle of attack of about 14°. Auxiliary cutting blades 147 are about ¾" long, ⅜ inches wide, have a thickness of between 0.2 and 30 thousandths of an inch and are razor sharp. The sprockets connecting the shaft of the cutting blade assembly 141 to sprocket 129 is such that the cutting blades on the cutting blade assembly 141 move at a speed of about 3500 feet per minute. It has been found that the shape and angle of attack of the main cutting blade and the tapering of the trailing edge of the main cutting blades as well as the relatively slow speed at which the assembly turns, drastically reduces cutting action noise. Mowing attachment 15 further includes a front bumper 149 composed of a cushion 151, a holding bumper kill switch 121 and a plow 153.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

I claim:

1. An automatic self-propelled, self-steering lawn mower adapted to follow a passive ribbon or wire of ferromagnetic material or permanent magnet impregnated material comprising:
   (a) a prime mover, and
   (b) a mower cutting attachment coupled to said prime mover,
   (c) said prime mover comprising:
      (1) a frame,
      (2) left and right drive wheels mounted on and at least partially supporting said frame,
      (3) a motor driven drive shaft mounted on said frame,
      (4) left and right solenoid operated clutch means for coupling the drive shaft to the left and right drive wheels respectively,
      (5) left and right solenoids coupled to said left and right solenoid operated clutch means, respectively, and
      (6) a guidance and control assembly rigidly mounted on the frame for sensing deviations in the path of travel of said prime mover relative to said passive ribbon or wire and in response to said deviations decoupling one or both of said clutch means so as to either cause said prime mover to turn in a direction so as to correct such deviations or cut off the power to said drive wheels and quidance and control assembly comprising:
         (a) a housing, a shaft mounted on the housing for rotational movement about its longitudinal axis,
         (b) a bar magnet fixedly mounted on the shaft for self-rotation toward said passive ribbon or wire about a substantially horizontal axis directed substantially fore-and-aft with respect to the prime mover, said magnet being eccentrically mounted on said housing so as to tilt to one side when not under the influence of said passive ribbon or wire,
         (c) a rotary switch, said rotary switch having a freely movable rotor arm and a fixed stator, said stator having a plurality of contacts,
         (d) said stator being fixedly mounted on the housing, said rotor arm being fixedly mounted on the shaft on the housing and said stator contacts being selectively connected electrically to said left and right clutch solenoids so as to selectively decouple one or both of said clutches according to the angular position of the magnet relative to the passive ribbon or wire.

2. The lawn mover of claim 1 and wherein said mower cutting attachment includes an aerodynamically clean dome, a rotatably mounted disk, a plurality of main cutting blades mounted on the periphery of said disk and a plurality of razor sharp auxiliary blades mounted on the periphery of said disk.

3. The lawn mower of claim 2 and wherein said main blades have a leading edge that tapers at about 14°, a trailing edge that tapers at about 6° and an angle of attack of about 14°.

4. The lawn mower of claim 3 and wherein said motor is battery driven and wherein said rotating disk is mechanically coupled to said motor and arranged to turn so as to provide a blade tip speed of about 3500 feet per minute.

5. An automatic self-propelled, self-steering lawn mower adapted to follow a passive ribbon or wire of ferromagnetic material or permanent magnet impregnated material comprising:
   (a) a prime mover, and
   (b) a mower cutting attachment coupled to said prime mover,
   (c) said prime mover comprising:
      (1) a frame,
      (2) left and right drive wheels mounted on and at least partially supporting said frame,
      (3) a motor driven drive shaft mounted on said frame,
      (4) left and right solenoid operated clutch means for coupling the drive shaft to the left and right drive wheels respectively,
      (5) left and right solenoids coupled to said left and right solenoid operated clutch means, respectively, and
      (6) a guidance and control assembly for sensing deviations in the path of travel of said prime mover relative to said passive ribbon or wire and in response to said deviations decoupling one or both of said clutch means so as to either cause said prime mover to turn in a direction so as to correct such deviations or cut off the power to said drive wheels and guidance and control assembly comprising:
         (a) a magnet mounted for self-rotation toward said passive ribbon or wire about a substantially horizontal axis directed substantially fore-and-aft with respect to the prime mover,
         (b) a rotary switch, said rotary switch having a freely movable rotor arm and a fixed stator, said stator having a plurality of contacts,
         (c) said rotar arm being fixedly mounted relative to the magnet and said stator contacts being selectively connected electrically to said left and right clutch solenoids so as to selectively decouple one or both of said clutches according to the angular position of the magnet relative to the passive ribbon or wire,
         (d) a housing, said magnet being eccentrically mounted on said housing so as to tilt to one side when not under the influence of said passive ribbon or wire, and
         (e) a quantity of viscous fluid in the housing of said guidance and control assembly in contact with said manget for damping movement of said magnet.

6. The lawn mower of claim 5 and wherein said magent is a bar magnet having one of its poles facing downard and the other of its poles facing upward.

7. The lawn mower of claim 6 and wherein the prime mover further includes a separate brake mechanically coupled to each drive wheel, a separate electromagnet for energizing each brake and separate electrical means for connecting each electromagnet and solenoid to a particular contact on said stator.

8. The lawn mower of claim 7 and wherein the separate electrical means for connecting each stator contact to its respective solenoid or electromagnet includes electrical damping means for damping out sudden movements of the magnet caused by the prime mover travelling over rough or undulating terrain.

9. The lawn mower of claim 8 and wherein said stator contacts are arranged in an array extending radially outward from the axis of rotation of the magnet, said array comprising two groups of contacts symmetrically disposed about a central position, each group of contacts being electrically connected to the solenoid and electromagnet associated with one of the drive wheels.

10. A cutting attachment for use in a lawn mower comprising:
a disk adapted to be mounted for rotation on said lawn mower, said disk having thereon a main set of cutting blades and an auxiliary set of cutting blades, the thickness of the auxiliary blades being razor thin and serving to trim ragged edges to grass left by the main set of cutting blades, the main set of cutting blades being thicker than the auxiliary set of blades and performing the basic cutting of the grass wherein said auxiliary set of blades each have a thickness of about between 20 and 30 thousandths of an inch and are thinner than said main set of blades.

11. The attachment of claim 10 and wherein said main set of blades have a thickness of about ¼" at the center and a leading edge that tapers at an angle of about 14°.

12. The attachment of claim 11 and wherein said set of auxiliary blades are mounted on the periphery of the disk.

* * * * *